United States Patent
Suzuki (12)

(10) Patent No.: US 6,339,710 B1
(45) Date of Patent: Jan. 15, 2002

(54) RADIO SELECTIVE CALLING RECEIVER HAVING TELEPHONE DIRECTORY FUNCTION

(75) Inventor: Katsuroh Suzuki, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/995,264

(22) Filed: Dec. 19, 1997

(30) Foreign Application Priority Data

Dec. 20, 1996 (JP) .............................. 8/341918

(51) Int. Cl.⁷ .............................. H04Q 7/20; G08B 5/22
(52) U.S. Cl. ...................... 455/458; 455/412; 340/7.52; 340/7.55
(58) Field of Search ................................ 455/415, 458, 455/435, 38.1, 412; 340/825.44, 7.52, 7.55

(56) References Cited

U.S. PATENT DOCUMENTS

| 5,251,250 A | * 10/1993 | Obata et al. ............ 340/825.44 |
| 5,280,516 A | 1/1994 | Jang .......................... 455/31.2 |
| 5,363,429 A | * 11/1994 | Fujisawa ..................... 379/142 |
| 5,604,492 A | * 2/1997 | Abdul-Halim ......... 340/825.44 |
| 5,668,852 A | * 9/1997 | Holmes ..................... 455/31.2 |
| 5,675,324 A | * 10/1997 | Hashimoto et al. ..... 340/825.44 |
| 5,675,627 A | * 10/1997 | Yaker ..................... 340/825.44 |
| 5,694,453 A | * 12/1997 | Fuller et al. ................ 455/31.2 |
| 5,752,195 A | * 5/1998 | Tsuji et al. .................. 455/462 |
| 6,005,927 A | * 12/1999 | Rahrer et al. ................ 455/415 |

FOREIGN PATENT DOCUMENTS

| FR | 2 732 851 | * 10/1996 | ............ H04Q/7/06 |
| JP | 6-7337 | 1/1994 | ............ H04B/7/26 |
| WO | 96/31850 | * 10/1996 | ............ G08B/5/22 |

* cited by examiner

Primary Examiner—William Trost
Assistant Examiner—Rafael Perez-Gutierrez
(74) Attorney, Agent, or Firm—Scully, Scott, Murphy & Presser

(57) ABSTRACT

A radio selective calling receiver which has a telephone directory memory for storing telephone directory data constituted by a telephone number and a name and, upon receiving a message from a partner corresponding to the telephone number stored in the telephone directory memory, displays telephone directory data corresponding to the telephone number includes a unit for extracting the telephone number and the name from the received message and registering the telephone number and the name in the telephone directory memory as the telephone directory data.

2 Claims, 5 Drawing Sheets

F I G. 1
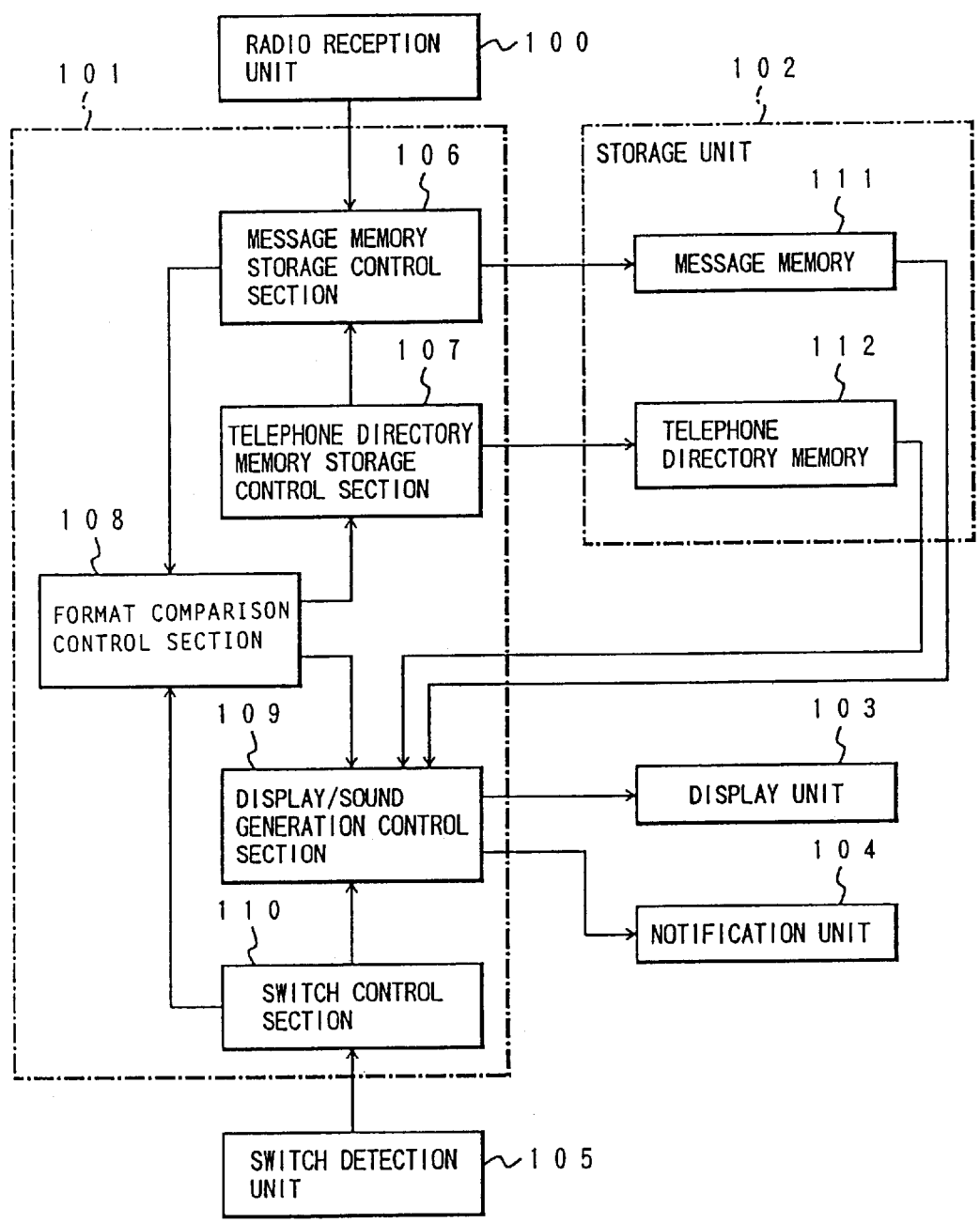

FIG. 5

| | TELEPHONE DIRECTORY NON-REGISTRATION FLAG | MESSAGE DATA FIELD |
|---|---|---|
| AREA 1 | 0 | 0123456789 |
| AREA 2 | 0 | [0330000001-ICHIRO SUZUKI] |
| AREA 3 | 1 | [0330000002-JIRO SUZUKI] |
| AREA 4 | - | FREE AREA |

FIG. 6

| NO. | NAME | TELEPHONE NUMBER |
|---|---|---|
| 1 | ICHIRO SUZUKI | 0330000001 |
| 2 | SABURO SUZUKI | 0330000003 |
| 3 | SHIRO SUZUKI | 0330000004 |
| 4 | GORO SUZUKI | 0330000005 |
| 5 | ROKURO SUZUKI | 0330000006 |

RADIO SELECTIVE CALLING RECEIVER HAVING TELEPHONE DIRECTORY FUNCTION

BACKGROUND OF THE INVENTION

1. Field of the Invention

The present invention relates to a radio selective calling receiver and, more particularly, to a radio selective calling receiver having not only a function of receiving and displaying a message but also a so-called telephone directory function.

2. Description of the Related Art

Radio selective calling receivers having a so-called telephone directory function in addition to a received message display function are known. According to a radio selective calling receiver of this type, when a message is received, data corresponding to the telephone number of the received message is retrieved from correspondence information (to be referred to as telephone directory data hereinafter) of the telephone number and name, which is stored in advance. The corresponding telephone directory data is retrieved and displayed. A radio selective calling receiver having such a telephone directory function is disclosed in Japanese Unexamined Utility Model Publication No. 6-7337.

The conventional radio selective calling receiver having a telephone directory function requires a switch operation for registering telephone directory data in the memory before use of the telephone directory function, and this operation is cumbersome. In addition, if a received message has a telephone number mismatching the telephone directory data registered in the memory, the caller cannot be known. The caller must be confirmed later, and his/her telephone number and name must be registered as telephone directory data by the switch operation.

SUMMARY OF THE INVENTION

The present invention has been made in consideration of the above situation, and has as its object to provide a radio selective calling receiver capable of reducing labor for the above-described switch operation for registering telephone directory data in use of the telephone directory function.

In order to achieve the above object, according to the first aspect of the present invention, there is provided a radio selective calling receiver which has a telephone directory memory for storing telephone directory data constituted by a telephone number and a name and, upon receiving a message from a partner corresponding to the telephone number stored in the telephone directory memory, displays telephone directory data corresponding to the telephone number, comprising:

means for extracting the telephone number and the name from the received message and registering the telephone number and the name in the telephone directory memory as the telephone directory data.

According to the second aspect of the present invention, there is provided a radio selective calling receiver which has a telephone directory memory for storing telephone directory data constituted by a telephone number and a name and, upon receiving a message from a partner corresponding to the telephone number stored in the telephone directory memory, displays telephone directory data corresponding to the telephone number, comprising:

means for determining whether the received message has a predetermined telephone directory registration format constituted by a telephone number and a name; and means for extracting the telephone directory data from the message having the telephone directory registration format and registering the telephone directory data in the telephone directory memory.

According to the third aspect of the present invention, there is provided a radio selective calling receiver of the second aspect, further comprising means for extracting, from a message which has been received and stored in the past and whose telephone directory data has not been registered, the telephone directory data and registering the telephone directory data in the telephone directory memory.

According the present invention having the above aspects, since the telephone directory data is automatically extracted from the received message and registered in the telephone directory memory, the user need not perform the cumbersome switch operation for registering the telephone directory data in use of the telephone directory function. For a message whose telephone directory data cannot be registered, the telephone directory data can be registered later, so a high operability can be obtained.

The above and many other objects, features and advantages of the present invention will become manifest to those skilled in the art upon making reference to the following detailed description and accompanying drawings in which preferred embodiments incorporating the principles of the present invention are shown by way of illustrative examples.

BRIEF DESCRIPTION OF THE DRAWINGS

FIG. 1 is a block diagram showing the arrangement of an embodiment of the present invention;

FIG. 5 is a schematic view showing contents stored in a message memory in the embodiment shown in FIG. 1; and FIG. 6 is a schematic view showing contents stored in a telephone directory memory in the embodiment shown in FIG. 1.

DETAILED DESCRIPTION OF THE PREFERRED EMBODIMENT

Figure 2:
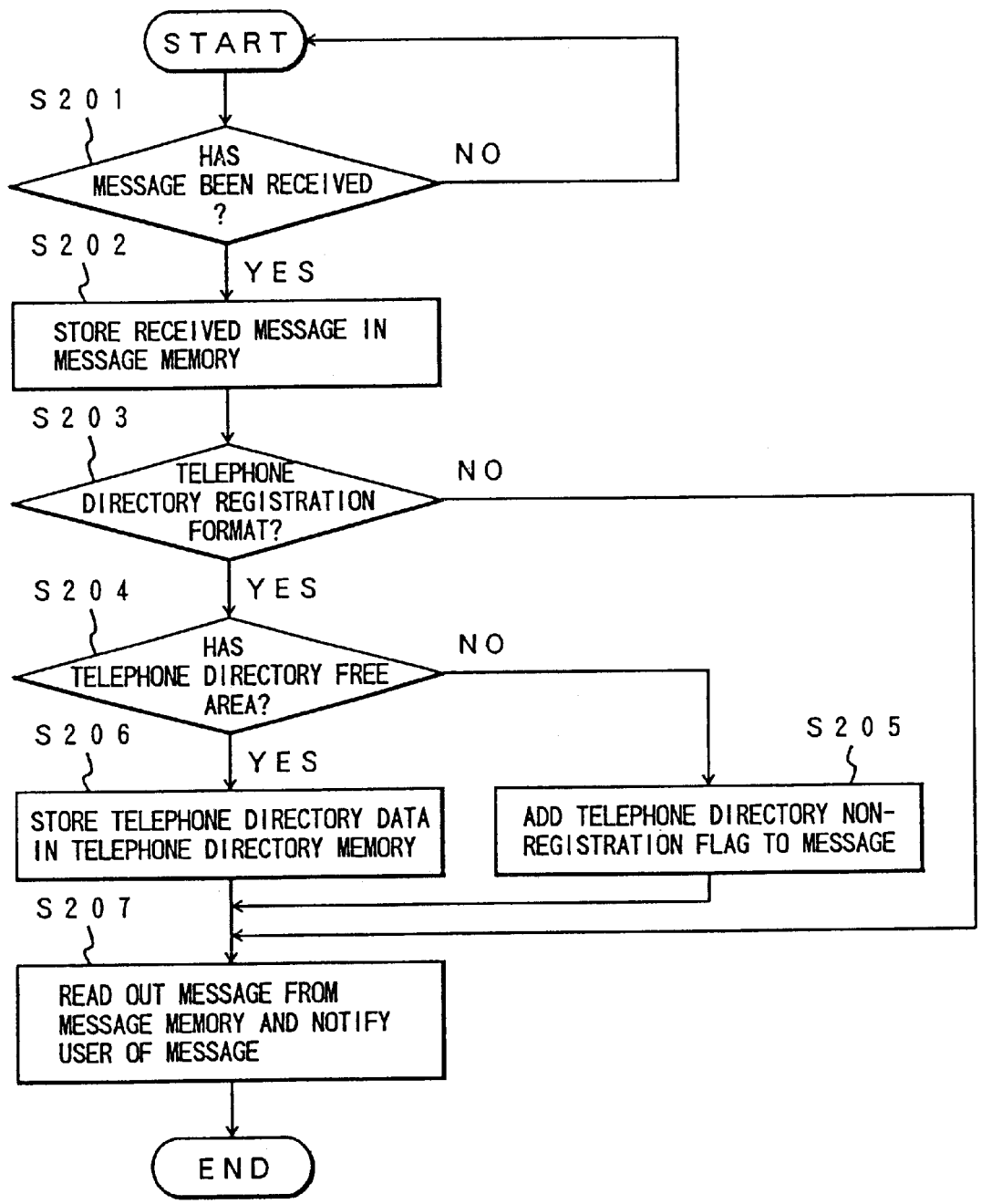
FIG. 2 is a flow chart showing an operation performed when a message has been received in the embodiment shown in FIG. 1.

A radio selective calling receiver according to a preferred embodiment of the present invention will be described below with reference to the accompanying drawings.

FIG. 1 is a block diagram showing the arrangement of a radio selective calling receiver according to an embodiment of the present invention. As shown in FIG. 1, this radio selective calling receiver comprises a radio reception unit 100 for demodulating a radio signal received via an antenna, a control unit 101 operated under the program control, a storage unit 102 for storing information, a display unit 103 for displaying a message or the like, a notification unit 104 for generating sound to notify the user of message reception, and a switch detection unit 105 for detecting the state of an operation switch.

The control unit 101 comprises a message memory storage control section 106, a telephone directory memory storage control section 107, a format comparison control section 108, a display/sound generation control section 109, and a switch control section 110. The storage unit 102 comprises a message memory 111 and a telephone directory memory 112. FIG. 5 shows contents stored in the message memory 111; and FIG. 6 shows contents stored in the telephone directory memory 112.

Figure 3:
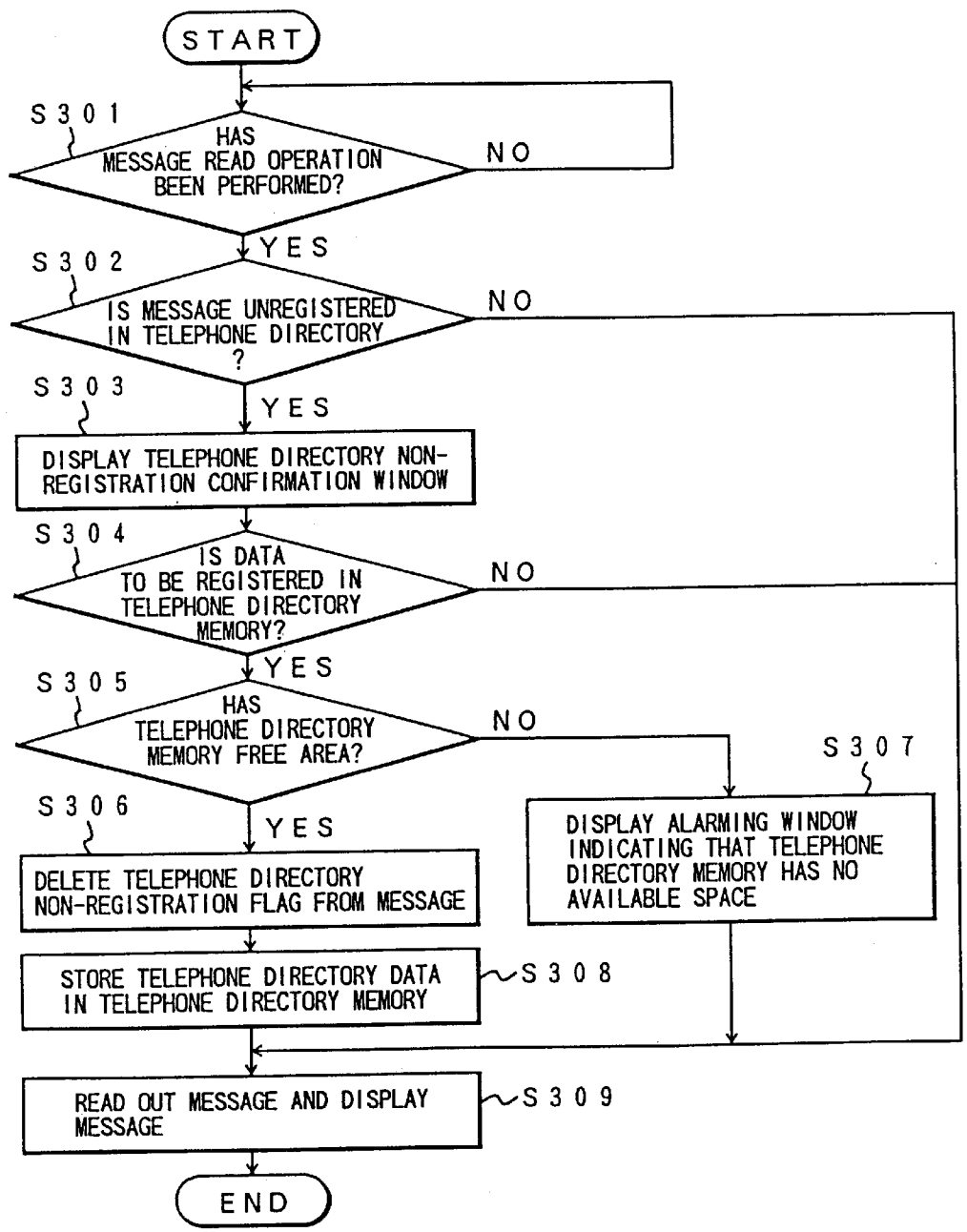
FIG. 3 is a flow chart showing an operation performed when a switch operation is performed in the embodiment shown in FIG. 1.
Figure 4:
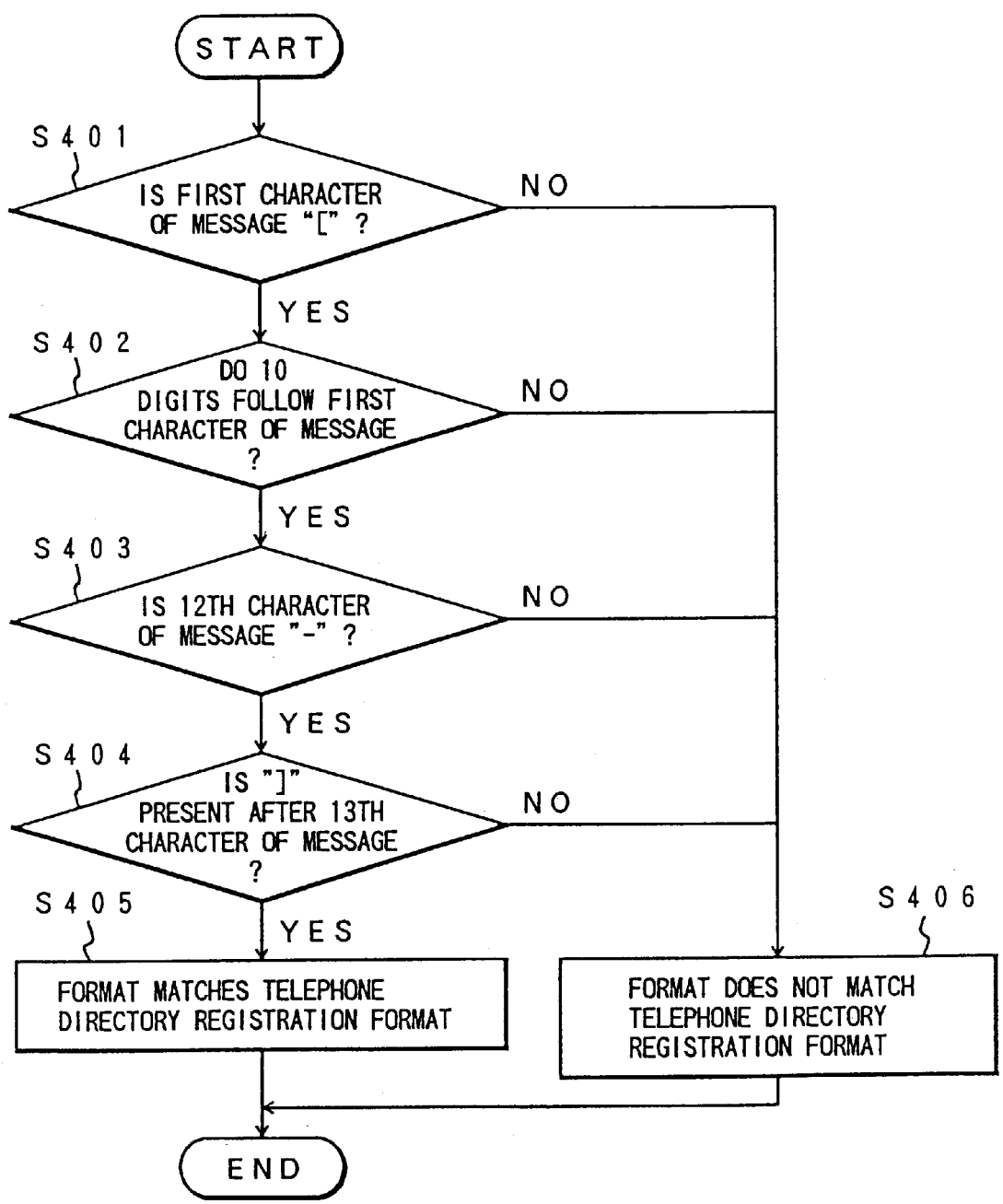
FIG. 4 is a flow chart showing the determination flow of a format comparison control means in the embodiment of the present invention.

FIGS. 2 to 4 are flow charts showing the operation of this embodiment. The operation of this embodiment will be described below with reference to these drawings.

An operation performed when a message has been received will be described first with reference to FIG. 2. Upon receiving a radio signal, the radio reception unit 100 demodulates the signal, extracts a message from the received information, and notifies the message memory storage control section 106 of reception (step S201). The message extracted from the received information is stored in the message memory 111 by the message memory storage control section 106 (step S202). The format comparison control section 108 determines whether the message has a predetermined telephone directory registration format (step S203). If YES in step S203, the telephone directory memory storage control section 107 is notified of it.

Upon receiving this information, the telephone directory memory storage control section 107 determines whether the telephone directory memory 112 has a free area (step S204). If NO in step S204, the message memory storage control section 106 is notified of it, and a telephone directory non-registration flag is added to the message which has already been stored in the message memory 111 in step S202 (step S205). If YES in step S204, the telephone directory memory storage control section 107 stores telephone directory data contained in the message in the telephone directory memory 112 (step S206).

The display/sound generation control section 109 reads out the message from the message memory 111, displays the message on the display unit 103 in the designated manner, and causes the notification unit 104 to notify the user of it (step S207). If telephone directory data corresponding to the telephone number of the received message is present in the telephone directory memory 112, the telephone directory data is read out and displayed on the display unit 103.

An operation performed when a switch operation is performed will be described next with reference to FIG. 3. The switch detection unit 105 detects the switch operation which is performed by the user to set the operation of the radio selective calling receiver, and notifies the switch control section 110 of it.

When the switch control section 110 detects a switch operation for reading a message (step S301), the message is read out, and it is determined whether the readout message is telephone directory unregistered message (step S302). If YES in step S302, the display/sound generation control section 109 displays a telephone directory registration confirmation window on the display unit 103 (step S303) and requests the user to select whether the telephone directory data is to be registered (step S304).

When the switch control section 110 detects a switch operation for determining telephone directory registration, the telephone directory memory storage control section 107 is notified of it. In this case, the telephone directory memory storage control section 107 determines whether the telephone directory memory 112 has a free area (step S305). If NO in step S305, the telephone directory memory storage control section 107 notifies the display/sound generation control section 109 of it. The display/sound generation control section 109 displays an alarming window indicating that the telephone directory memory 112 has no capacity (step S307). If YES in step S305, the telephone directory memory storage control section 107 notifies the message memory storage control section 106 of it and removes the telephone directory non-registration flag from the message (step S306). The telephone directory memory storage control section 107 stores telephone directory data contained in the message in the telephone directory memory 112 (step S308). The display/sound generation control section 109 reads out the message from the message memory 111 and displays the message on the display unit 103 (step S309).

The operation of this embodiment will be described next in more detail on the basis of a specific example. In the operation example to be described below, the telephone directory registration format is "[telephone number (10 digits)—name]".

When the radio reception unit 100 has received a message "[0330000001—Ichiro Suzuki]", the message memory storage control section 106 is notified of this reception. The message memory storage control section 106 stores this message "[0330000001—Ichiro Suzuki]" in area 2 of the message memory 111 (FIG. 5).

Next, the format comparison control section 108 determines whether this message has a telephone number registration format (step S203). FIG. 4 shows the determination flow of the format comparison control section 108.

It is determined first whether the first character of the message is "[" (step S401). In this example, the first character of the message is "[", so it is determined next whether 10 digits follow "[" (step S402). In this example, 10 digits "0330000001" follow "[", so it is determined next whether the 12$^{th}$ character of the message is "_" (step S403). Since the 12$^{th}$ character of the message is "_", it is determined next whether any of the characters after the 13$^{th}$ character of the message is "]" (step S404). Since the 24$^{th}$ character of the message is "]", it can be determined that this message has a telephone directory registration format.

A name "Ichiro Suzuki" between telephone number "0330000001", "-", and "]" is stored in "No. 1" of the telephone directory memory 112 by the telephone directory memory storage control section 107 (FIG. 6). The display/sound generation control section 109 reads out the message from area 2 of the message memory 111, displays the message on the display unit 103, and causes the notification unit 104 to notify the user of it.

An operation performed when a message "[0330000002—Jiro Suzuki]" has been received, and the telephone directory memory 112 has no capacity, as shown in FIG. 6, will be described next.

When a message "[0330000002—Jiro Suzuki]" has been received, and the radio reception unit 100 has notified the message memory storage control section 106 of the reception, the message memory storage control section 106 stores the message in area 3 of the message memory 111 (FIG. 5).

The format comparison control section 108 determines whether this message has a telephone directory registration format (step S203).

It is determined first whether the first character of the message is "[" (step S401). In this example, the first character of the message is "[", so it is determined next whether 10 digits follow "[" (step S402). In this example, 10 digits "0330000002" follow "[", so it is determined next whether the 12$^{th}$ character of the message is "_" (step S403). In this example, the 12$^{th}$ character of the message is "_", so it is determined next whether any of the characters after the 13$^{th}$ character of the message is "]" (step S404). Since the 24$^{th}$ character of the message is "]", it can be determined that this message has a telephone directory registration format.

In this example, a name "Jiro Suzuki" between telephone number "0330000002", "-", and "]" is supposed to be stored in the telephone directory memory 112. However, since all areas of the telephone directory memory 112 have data, and there is no available space (step S204), a telephone directory non-registration flag is set in area 3 of the message memory 111 by the message memory storage control section 106 (step S205; FIG. 5). The display/sound generation control section 109 reads out the message from area 3 of the message memory 111, displays the message on the display unit 103, and causes the notification unit 104 to notify the user of it.

An operation performed when the message "[0330000002—Jiro Suzuki]" is to be read out from area 3 of the message memory 111 where the telephone directory non-registration flag has been set will be described next.

When a switch operation is performed to read out the message from area 3 of the message memory 111, and the switch control section 110 detects the switch operation (step S301), it is determined whether the message is a message which has not been registered in the telephone directory memory 112 yet (step S302). In this case, since the telephone directory non-registration flag has been set in area 3 of the message memory 111, the display/sound generation control section 109 displays the message in area 3 on the display unit 103 (step S303) and requests the user to select whether the telephone directory data is to be registered (step S304).

When the user performs a switch operation for determining telephone directory registration, and this switch operation is detected by the switch control section 110, the telephone directory memory storage control section 107 is notified of it. The telephone directory memory storage control section 107 determines whether the telephone directory memory has a free area (step S305). If all areas have data, and there is no available space, the display/sound generation control section 109 is notified of it, so an alarming window indicating that the telephone directory memory has no capacity (step S307).

If a switch operation for deleting data in "No. 5", of the telephone directory memory 112 has already been performed by the user, the free area of "No. 5" of the telephone directory memory 112, which is obtained upon deleting data in "No. 5", is confirmed in step S305.

In this case, the message memory storage control section 106 is notified of the detection of the switch operation for determining telephone directory registration, and the telephone directory non-registration flag in area 3 of the message memory 111 is deleted (step S306). The telephone number "0330000002" and name "Jiro Suzuki", i.e., telephone directory data in area 3 of the message memory 111, is stored in "No. 5" of the telephone directory memory 112 by the telephone directory memory storage control section 107 (step S308). The display/sound generation control section 109 reads out the message from area 3 of the message memory 111 and displays the message on the display unit 103 (step S309).

What is claimed is:

1. A radio selective calling receiver which has a telephone directory memory for storing telephone directory data constituted by a telephone number and a name and, upon receiving a message from a partner corresponding to the telephone number stored in said telephone directory memory, displays telephone directory data corresponding to the telephone number, comprising:

means for determining whether the received message has a predetermined telephone directory registration format constituted by a telephone number and a name;

means for extracting the telephone directory data from the message having the telephone directory registration format and registering the telephone directory data in said telephone directory memory, and means for extracting, from a message which has been received and stored in a message memory in the past and whose telephone directory data has not been registered, the telephone directory data from the message memory and registering the telephone directory data in said telephone directory memory.

2. A radio selective calling receiver which has a telephone directory memory for storing telephone directory data constituted by a telephone number and a name and, upon receiving a message from a partner corresponding to the telephone number stored in said telephone directory memory, displays telephone directory data corresponding to the telephone number, the radio selective calling receiver comprising:

means for extracting the telephone number and the name from the received message and registering the telephone number and the name in said telephone directory memory as the telephone directory data; and means for extracting, from a message which has been received and stored in a message memory in the past and whose telephone directory data has not been registered, the telephone directory data from the message memory and registering the telephone directory data in said telephone directory memory.

* * * * *